United States Patent
Kamiya

(10) Patent No.: US 10,534,855 B2
(45) Date of Patent: Jan. 14, 2020

(54) EXI GRAMMARS TO REPRESENT JSON SCHEMAS

(71) Applicant: FUJITSU LIMITED, Kawasaki-shi, Kanagawa (JP)

(72) Inventor: Takuki Kamiya, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 508 days.

(21) Appl. No.: 15/144,600

(22) Filed: May 2, 2016

(65) Prior Publication Data

US 2017/0315970 A1 Nov. 2, 2017

(51) Int. Cl.
*G06F 17/20* (2006.01)
*G06F 17/22* (2006.01)
*G06F 17/27* (2006.01)

(52) U.S. Cl.
CPC ........ *G06F 17/227* (2013.01); *G06F 17/2247* (2013.01); *G06F 17/2264* (2013.01); *G06F 17/272* (2013.01)

(58) Field of Classification Search
CPC . G06F 17/272; G06F 17/2247; G06F 17/2264
USPC ........................................................ 715/239
See application file for complete search history.

(56) References Cited

U.S. PATENT DOCUMENTS

| | | | | |
|---|---|---|---|---|
| 8,533,665 B2* | 9/2013 | Yu | ........................ | G06F 9/4488 717/108 |
| 9,069,774 B1* | 6/2015 | Ansari | ................ | G06F 11/3006 |
| 9,454,348 B2* | 9/2016 | Sabbouh | .................... | G06F 8/31 |
| 9,454,620 B2* | 9/2016 | Sabbouh | ................. | G06F 16/81 |
| 9,485,306 B2* | 11/2016 | Sabbouh | ................. | G06F 9/4493 |
| 9,507,762 B1* | 11/2016 | Lashley | ................... | G06F 16/00 |
| 9,639,631 B2* | 5/2017 | Williamson | ........ | G06F 17/2247 |
| 9,858,299 B2* | 1/2018 | Rashid | ................... | G06F 16/211 |
| 10,097,440 B2* | 10/2018 | Kaplinger | ............... | G06F 16/00 |
| 10,168,999 B2* | 1/2019 | Kota | .......................... | G06F 8/30 |
| 10,223,550 B2* | 3/2019 | Staykov | .................. | G06F 21/64 |
| 2014/0067866 A1* | 3/2014 | Chen | ....................... | H04L 69/06 707/791 |
| 2014/0207826 A1* | 7/2014 | Gao | ....................... | G06F 16/211 707/803 |

(Continued)

OTHER PUBLICATIONS

Papagiannopoulos, (Master thesis, "JSON Application Programming Interface for Discrete Event Simulation data exchange", University of Limerick, published online Oct. 1, 2014 at https://ulir.ul.ie/bitstream/handle/10344/4847/Papagiannopolos_2015_JSON.pdf?sequence=6/ (Year: 2014).*

(Continued)

*Primary Examiner* — Mohammed H Zuberi
(74) *Attorney, Agent, or Firm* — Maschoff Brennan

(57) ABSTRACT

A method of converting a JavaScript Object Notation (JSON) schema to an Efficient Extensible Markup Language (XML) Interchange (EXI) document. The method may include generating an XML structure from a JSON schema for data at a first size and including one or more properties, wherein the one or more properties are XML attribute names in the XML structure. The method may also include generating an EXI grammar including the one or more properties. Further, the method may include generating the EXI document for the data at a second size smaller than the first size and based on the EXI grammar.

20 Claims, 12 Drawing Sheets

(56) References Cited

U.S. PATENT DOCUMENTS

2015/0378685 A1* 12/2015 Kaplinger ............. G06F 16/958
  717/104
2015/0378994 A1* 12/2015 Kaplinger ............... G06F 16/88
  707/722
2016/0117410 A1    4/2016 Kamiya

OTHER PUBLICATIONS

Kabisch "Resource Optimization of SOA-Technologies in Embedded Networks," Dissertation, University of Passau, Nov. 2013 (Year: 2013).*
Snyder "Efficient XML Interchange (EXI) Compression and Performance Benefits: Development, Implementation and Evaluation", Master Thesis, Mar. 2010, hereafter Snyder'2010 (Year: 2010).*
W3C, "Efficient XML Interchange (EXI) Format 1.0 (Second Edition), W3C Recommendation", Feb. 11, 2014 (Year: 2014).*
EXI for JSON specification. https://www.w3.org/TR/exi-for-json/, Jan. 28, 2016.
EXI specification. http://www.w3.org/TR/exi/, Feb. 11, 2014.
XSLT 3.0 (W3C XQuery WG). See https://www.w3.org/TR/xslt-30/#json, Nov. 19, 2015.
JSONx (IBM). See https://tools.ietf.org/html/draft-rsalz-jsonx-00, May 2, 2011.

* cited by examiner

EXI GRAMMARS TO REPRESENT JSON SCHEMAS

FIELD

The embodiments discussed herein are related to Efficient XML Interchange (EXI) grammars to represent JavaScript Object Notation (JSON) schemas.

BACKGROUND

Extensible Markup Language (XML) is a markup language that defines a set of rules for encoding documents in a plain-text format that is both human-readable and machine-readable. One version of XML is defined in the XML 1.0 Specification produced by the World Wide Web Consortium (W3C) and dated Nov. 26, 2008, which is incorporated herein by reference in its entirety. The XML 1.0 Specification defines an XML document as a text that is well-formed and valid.

An XML schema is a description of a type of XML document, typically expressed in terms of constraints on the structure and content of documents of that type, above and beyond the basic syntactical constraints imposed by the XML 1.0 Specification itself. These constraints are generally expressed using some combination of grammatical rules governing the order of elements, Boolean predicates associated with the content, data types governing the content of elements and attributes, and more specialized rules such as uniqueness and referential integrity constraints. The process of checking to see if an XML document conforms to an XML schema is called validation, which is separate from XML's core concept of syntactic well-formedness. All XML documents are defined as being well-formed, but an XML document is on check for validity where the XML processor is "validating," in which case the XML document is checked for conformance with its associated schema.

Although the plain-text human-readable aspect of XML documents may be beneficial in many situations, this human-readable aspect may also lead to XML documents that are large in size and therefore incompatible with devices with limited memory or storage capacity. Efforts to reduce the size of XML documents have therefore often eliminated this plain-text human-readable aspect in favor of more compact binary representations.

EXI is a Binary XML format in which XML documents are encoded in a binary data format rather than plain text. In general, using a binary XML format reduces the size and verbosity of XML documents, and may reduce the cost in terms of time and effort involved in parsing XML documents. EXI is formally defined in the EXI Format 1.0 Specification produced by the W3C and dated Mar. 10, 2011, which is incorporated herein by reference in its entirety. An XML document may be encoded in an EXI format as a separate EXI stream.

When no schema information is available or when available schema information describes only portions of an EXI stream, EXI employs built-in element grammars. Built-in element grammars are dynamic and continuously evolve to reflect knowledge learned while processing an EXI stream. New built-in element grammars are created to describe the content of newly encountered elements and new grammar productions are added to refine existing built-in grammars. Newly learned grammars and productions are used to more efficiently represent subsequent elements in the EXI stream.

JSON is a lightweight data interchange format for structuring data for transmission (e.g., between a server and a web application). A JSON schema is a tool for validating the structure of JSON data in a simplified, more efficient manner. JSON may be growing in popularity in part because it is considered to be easy to read and write for humans. JSON is a text format independent of any language but uses conventions that may be considered to be familiar with the languages descended from C, such as C, C++, C#, Java, JavaScript, Perl, Python, and others. JSON may be considered a data exchange language in part because of the overlap of conventions with languages descended from C.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of representing a constraint in a JavaScript Object Notation (JSON) schema in an Efficient XML Interchange (EXI) grammar may include generating an XML structure from a JSON schema including one or more properties, wherein the one or more properties are XML attribute names in the XML structure. The method may also include generating the EXI grammar including the one or more properties.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The embodiments discussed herein are related to Efficient XML Interchange (EXI) grammars to represent JavaScript Object Notation (JSON) schemas. In one embodiment, an XML structure may be generated from a JSON schema, wherein one or more property names in the XML structure are XML attribute names. Further, an EXI grammar including the one or more property names may be generated. In addition, an EXI document may be generated based on the EXI grammar. According to one embodiment, the JSON schema may include data at a first size, and the EXI document may include the data at a second, smaller size.

In another embodiment, one or more processors may be modified according to the techniques described herein and used to generate an XML structure and an EXI grammar from a JSON schema. More specifically, for example, the one or more processors may be configured to generate an XML structure (e.g., from a JSON schema) including one or more properties, wherein the one or more properties are XML attribute names. Further, the one or more processors may be configured to generate an EXI grammar including the one or more properties. In addition, the one or more processors may be configured to generate an EXI document based on the EXI grammar. According to one embodiment, the JSON schema may include data at a first size, and the EXI document may include the data at a second, smaller size.

Various embodiments may provide for more precise EXI grammar description of one or more constraints defined in a JSON schema object. Use of more precise EXI grammar may result in improved compaction, less required memory, and more efficient and faster data communication compared with conventional systems and methods. Due to smaller message sizes, various embodiments may be amenable to low memory constrained devices, such as sensors and microcontrollers. In addition, EXI grammars, as described herein, may provide for a reduced footprint (e.g., during implementation) compared to conventional systems and methods. According to various embodiments disclosed herein, a size of the data in a generated EXI document may be smaller than the size of the data of a JSON document that the EXI document represents.

Embodiments of the present invention will be explained with reference to the accompanying drawings.

Figure 1A:
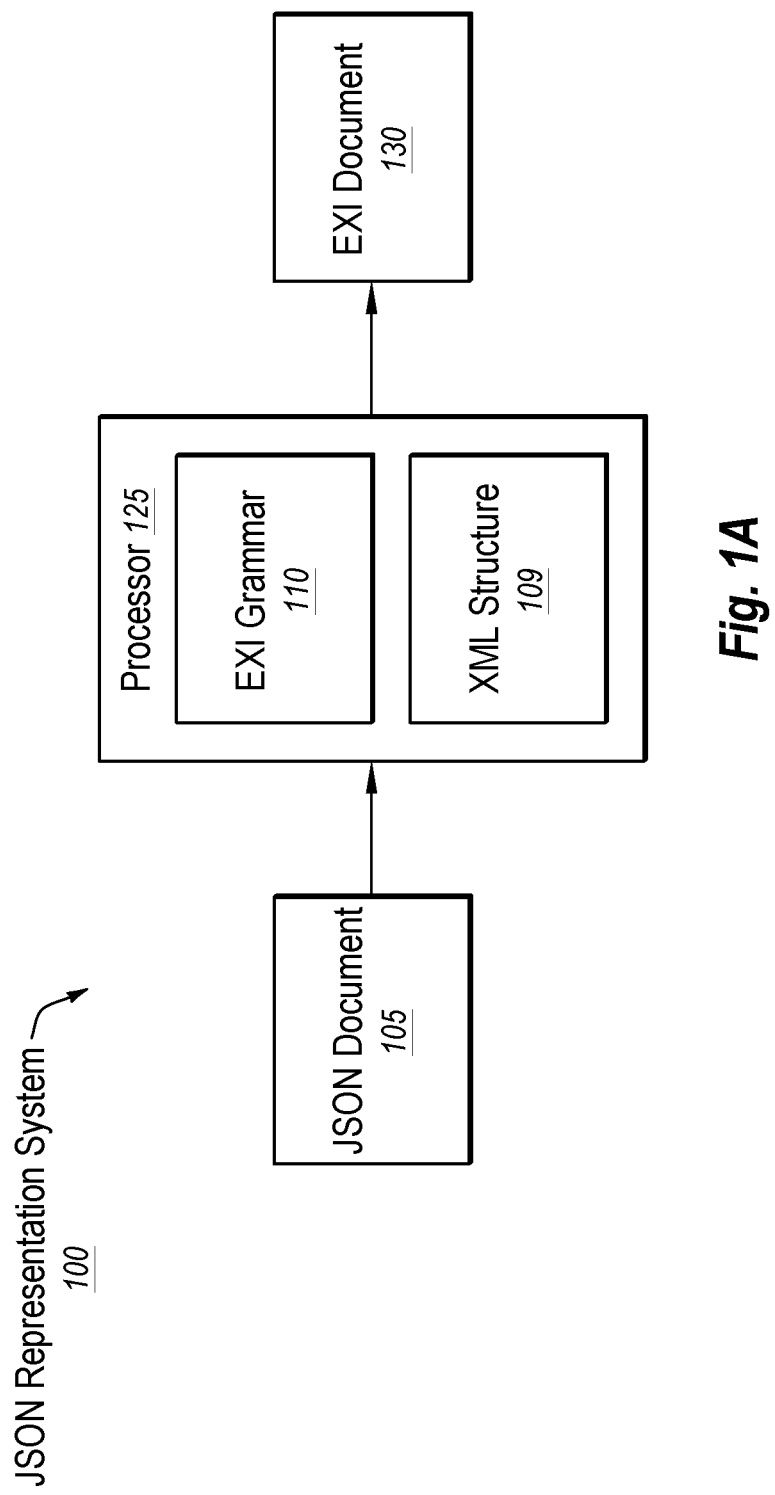
FIGS. 1A and 1B are block diagrams of an example JavaScript Object Notation (JSON) representation system.

FIG. 1A is a block diagram of an example JSON representation system 100, arranged in accordance with at least some embodiments described herein. JSON representation system 100 may be implemented as a component of a processor-based computing device. For example, JSON representation system 100 may include one or more components of a tablet computer, a laptop computer, a desktop computer, a mainframe, or any other processor-based computing device.

JSON representation system 100 may include a JSON document 105, an EXI grammar 110 for JSON, an EXI processor 125, and an EXI document 130 representing JSON document 105. According to various embodiments disclosed herein, a size of the data in EXI document 130 may be smaller than the size of the data of JSON document 105.

JSON document 105 may include any document written or encoded in the JSON format. EXI document 130 may include any document written or encoded in the EXI format which represents JSON document 105. EXI document 130 may be or include an EXI stream. EXI processor 125 may include code and routines configured to analyze a JSON document, generate an XML structure 109 and EXI Grammar 110 based on the JSON document. Further, EXI processor 125 may be configured to encode an EXI document representing the JSON document. For example, EXI processor 125 receives JSON document 105 as an input, generates XML structure 109 and EXI Grammar 110, and outputs EXI document 130 representing JSON document 105. Alternately, EXI processor 125 may be implemented in hardware or may include a combination of hardware and code and/or routines.

In one embodiment, EXI processor 125 may also include one or more EXI encoders, EXI decoders, or other EXI codes and routines configured to provide the functionality of EXI processor 125. Examples of EXI processors, EXI encoders, EXI decoders, and other EXI codes and routines may be described in the Efficient XML Interchange (EXI) Format 1.0 (Second Edition), which is incorporated by reference in its entirety.

EXI processor 125 may include support for JSON inputs or JSON outputs, or for both JSON inputs and JSON outputs. EXI processor 125 may be configured to encode EXI document 130 representing JSON document 105.

In one embodiment, EXI processor 125 may include code and routines configured to perform one or more blocks of methods 400, 500, 600, 700, 800 described below with reference to FIGS. 6-10 when executed by a processor-based computing device (see FIG. 1B).

EXI grammar 110 may include an EXI grammar configured to enable EXI processor 125 to receive a JSON document as an input and encode EXI document 130 representing JSON document 105 as an output. For example, EXI processor 125 is configured to receive JSON document 105, generate the EXI grammar 110, and encode EXI document 130 representing JSON document 105 as an output based on JSON document 105 and EXI grammar 110.

Figure 1B:
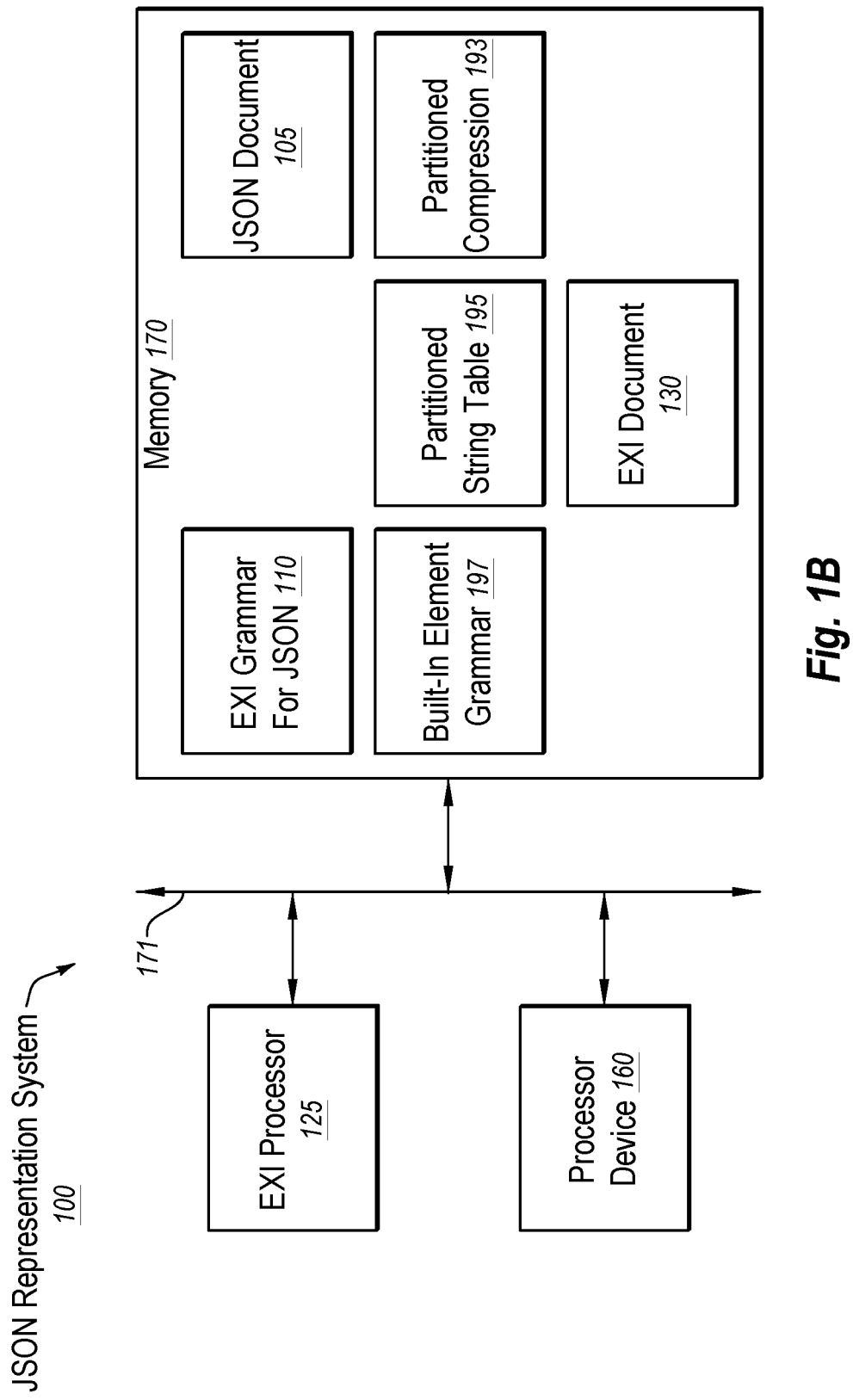

FIG. 1B is a block diagram of the example JSON representation system 100, arranged in accordance with at least one embodiment described herein. JSON representation system 100 of FIG. 1B is an example embodiment of JSON representation system 100 described above with reference to FIG. 1A. In some embodiments, JSON representation system 100 may include a processor-based computing device. For example, JSON representation system 100 may include a tablet computer, a laptop computer, a desktop computer, mainframe, or any other processor-based computing device. In some embodiments, JSON representation system 100 may include a special-purpose processor-based computing device configured to execute one or more blocks of methods 400, 500, 600, 700, 800 described below with reference to FIGS. 6-10 when executed by processing device 160.

JSON representation system 100 may include EXI processor 125, a processing device 160, and a memory 170. The various components of JSON representation system 100 may be communicatively coupled to one another via a bus 171.

Processing device 160 may include an arithmetic logic unit, a microprocessor, a general-purpose controller, or some other processor array to perform computations and provide electronic display signals to a display device. Processing device 160 processes data signals and may include various computing architectures including a complex instruction set computer (CISC) architecture, a reduced instruction set computer (RISC) architecture, or an architecture implementing a combination of instruction sets. Although FIG. 1B includes a single processing device 160, multiple processing devices 160 may be included. Other processors, operating systems, sensors, displays, and physical configurations are possible.

In one embodiment, JSON representation system 100 may include code and routines configured to perform or control performance of one or more blocks of methods 400, 500, 600, 700, 800 described below with reference to FIGS. 6-10 when executed by the processing device 160.

Memory 170 may store instructions and/or data that may be executed by processing device 160. The instructions and/or data may include code for performing the techniques described herein. In some embodiments, the instructions may include instructions and data which cause processing device 160 to perform a certain function or group of functions.

In some embodiments, memory 170 may include a computer-readable media for carrying or having computer-executable instructions or data structures stored thereon. Such computer-readable media may be any available media that may be accessed by processing device 160 that may be programmed to execute the computer-executable instructions stored on the computer-readable media. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store desired program code in the form of computer-executable instructions or data structures and which may be accessed by the processing device 160. Memory 170 may be a tangible or non-transitory computer-readable medium storing executable instructions which may be accessed and executed by processing device 160. Combinations of the above may also be included within the scope of computer-readable media.

In the depicted embodiment, memory 170 may store EXI grammar 110, JSON document 105, EXI document 130 representing JSON document 105, a built-in element grammar 197, a partitioned string table 195, and a partitioned compression 193.

Optionally, in some embodiments, memory 170 may store any other data to provide its functionality. For example, the memory 170 may store one or more libraries of standard functions or custom functions. In some embodiments, EXI processor 125 may include code and routines stored on memory 170 and executed by the processing device 160.

EXI grammar 110, JSON document 105, and EXI document 130 were described above with reference to FIG. 1A, and their descriptions will not be repeated here.

As used herein, the terms "module" or "component" may refer to specific hardware implementations configured to perform the operations of the module or component and/or software objects or software routines that may be stored on and/or executed by JSON representation system 100. In some embodiments, the different components and modules described herein may be implemented as objects or processes that execute on a computing system (e.g., as separate threads). While some of the system and methods described herein are generally described as being implemented in software (stored on and/or executed by JSON representation system 100), specific hardware implementations or a combination of software and specific hardware implementations are also possible and contemplated. In this description, a "computing entity" may include any computing system as defined herein, or any module or combination of modules running on a computing system such as JSON representation system 100.

Figure 2A:
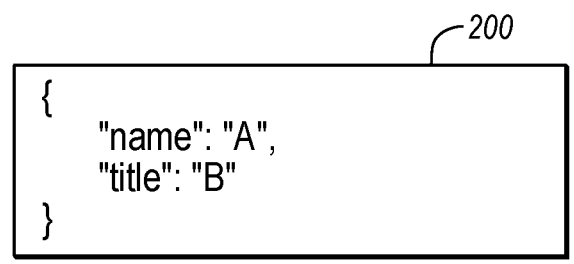
FIG. 2A depicts an example JSON structure.
Figure 2B:
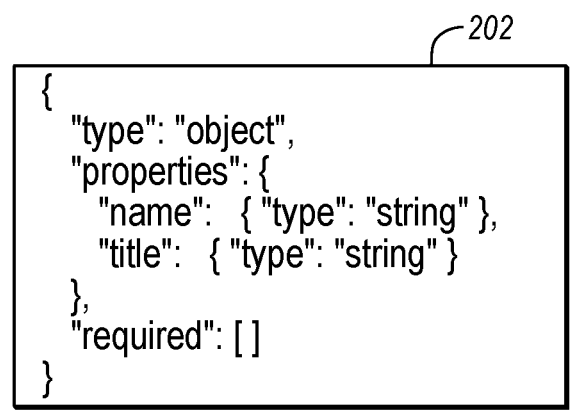
FIG. 2B depicts an JSON schema constraint.
Figure 2C:
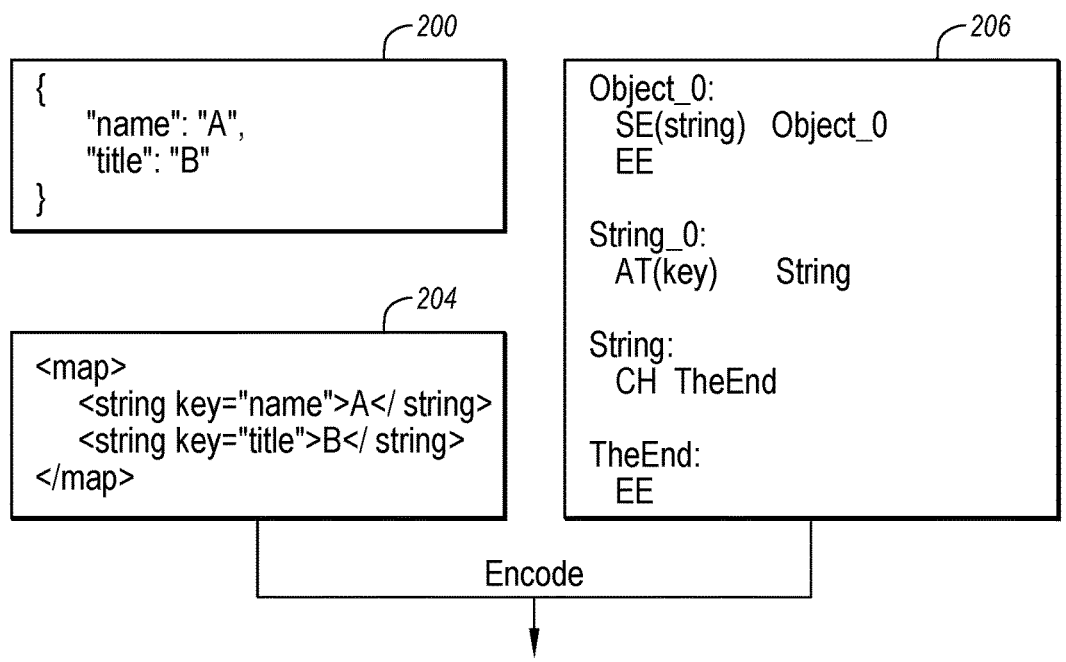
FIG. 2C illustrates an example JSON structure, an Extensible Markup Language (XML) representation of the JSON structure, and an associated Efficient XML Interchange (EXI) grammar.

FIG. 2A illustrates an example JSON structure 200. JSON structure 200 includes an object, which includes two optional properties, "name" and "title", wherein both properties are strings. It is noted that JSON object 200 may comprise, for example, 192 bits without whitespaces. FIG. 2B depicts a constraint in a JSON schema 202. FIG. 2C depicts JSON structure 200, an XML representation (also referred to herein as an "XML structure") 204 of JSON structure 200, and an EXI grammar 206, which is derived from JSON schema 202.

An EXI grammar (e.g., EXI grammar 206) may be employed, for example, by EXI processor 125 when decoding JSON document 105 or encoding EXI document 130 representing JSON document 105. An EXI grammar may include one or more tokens. A token may be an EXI grammar notation. The token may describe different events. For example, an EXI grammar may include one or more of the following tokens: EE; AT(*); SE(*); and CH. The EE token may correspond to an End Element EXI event type. The AT(*) token may correspond to an Attribute EXI event type. The SE(*) token may correspond to a Start Element EXI event type. The CH token may correspond to a Characters event type.

Figure 3:
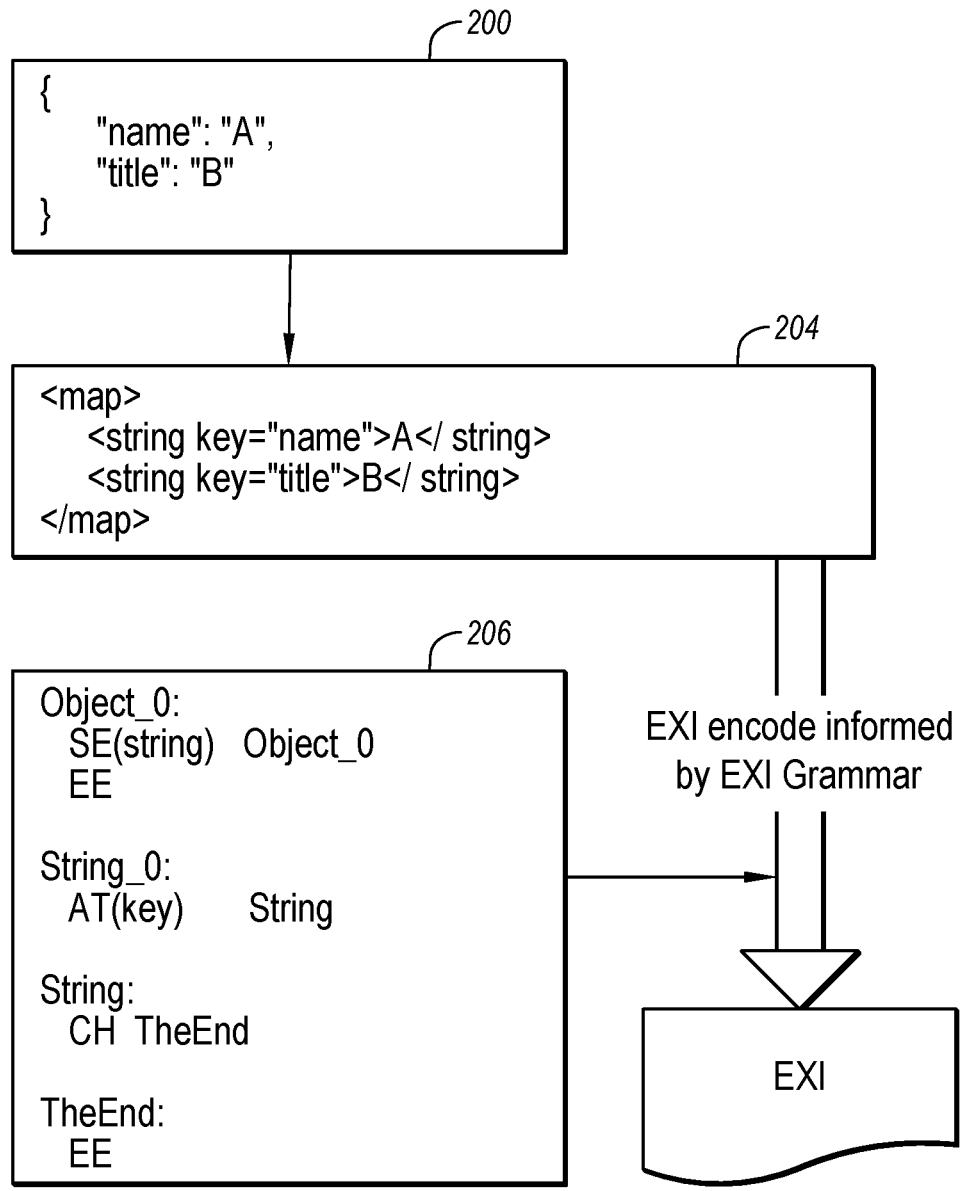
FIG. 3 is a block diagram of an EXI grammar and an XML structure.

FIG. 3 is another illustration of EXI grammar 206 generated from an XML structure 204, which is derived from JSON structure 200. In this example, JSON property names ("name" and "title") are represented in XML structure 204 as XML attribute values, and the JSON property names ("name" and "title") are not included in EXI grammar 206. Further, in this example, a system (e.g., system 100 of FIG. 1) may encode an EXI document, which may comprise of, for example, approximately 123 bits, based on EXI grammar 206 and XML structure 204.

Figure 4:
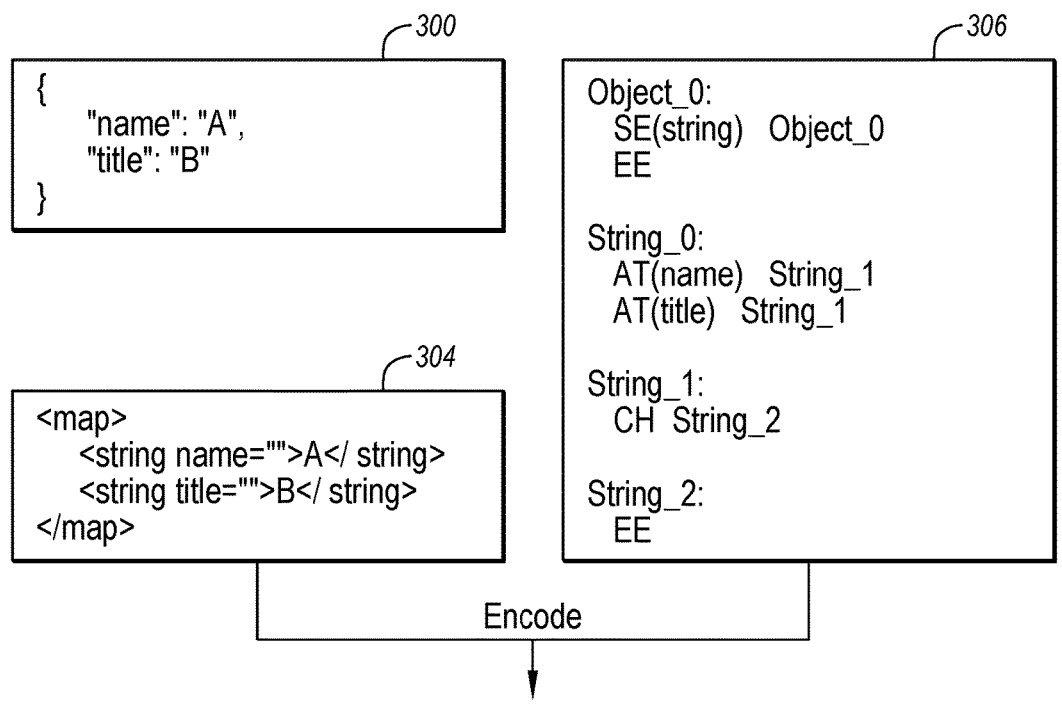
FIG. 4 depicts an example JSON structure, an Extensible Markup Language (XML) representation of the JSON structure, and an associated Efficient XML Interchange (EXI) grammar.

FIG. 4 depicts a JSON structure 300, an XML representation (also referred to herein as an "XML structure") 304 of JSON structure 300, and an EXI grammar 306, which is derived from XML representation 304. In this example, JSON property names ("name" and "title") are represented in XML structure 304 as XML attribute names, and the JSON property names ("name" and "title") are included in EXI grammar 306. Including the JSON property names in EXI grammar 306 may reduce the encodings by, for example only, approximately 88 bits. Further, in this example, a system (e.g., system 100 of FIG. 1) may encode an EXI document based on EXI grammar 306 and XML structure 304. For example only, the EXI document may comprise of 37 bits.

Figure 5:
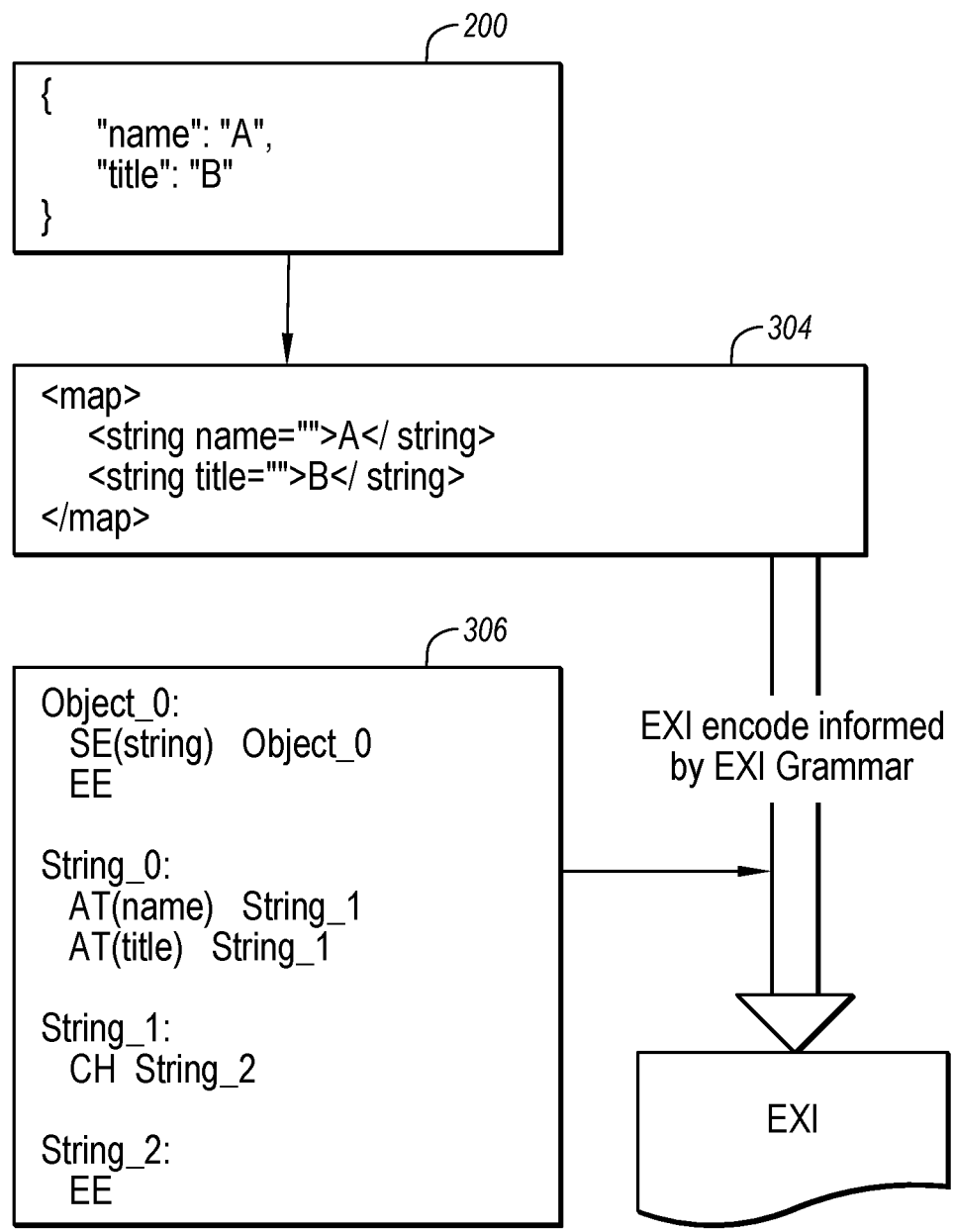
FIG. 5 depicts an EXI grammar generated from an XML structure.

FIG. 5 is an illustration of EXI grammar 306 generated from an XML structure 304, which is derived from JSON structure 200. As noted above, JSON structure 200 may include, for example, 192 bits without whitespaces. In this example, JSON property names ("name" and "title") are represented in XML structure 304 as XML attribute names, and the JSON property names ("name" and "title") are included in EXI grammar 306. Further, in this example, a system (e.g., system 100 of FIG. 1) may encode an EXI document, which may comprise of approximately 37 bits, based on EXI grammar 306 and XML structure 304.

Figure 6:
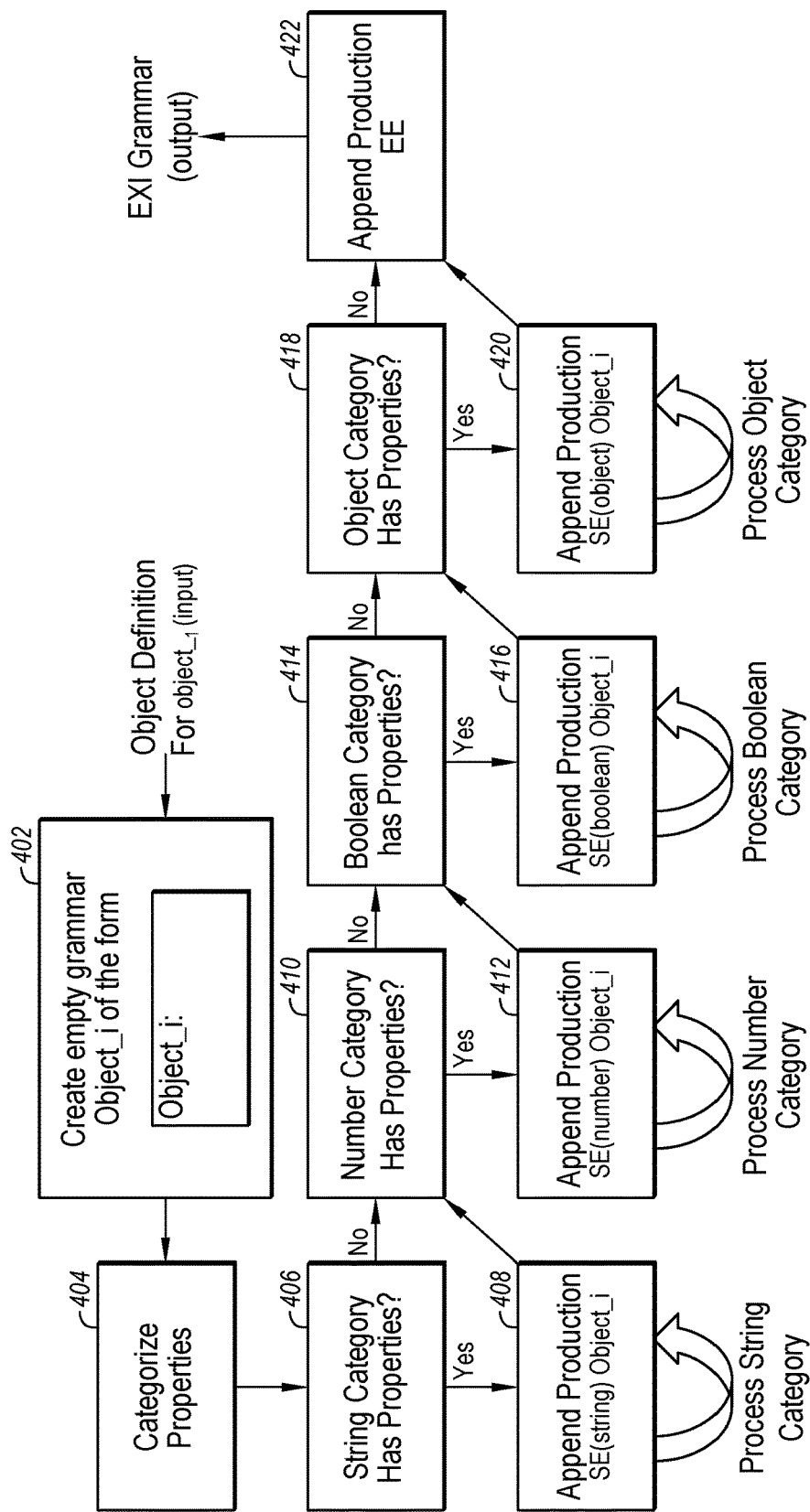
FIG. 6 is a block diagram of an example method of generating EXI grammar from JSON.

FIG. 6 shows an example flow diagram of a method 400 of generating an EXI grammar, arranged in accordance with at least one embodiment described herein. Although illustrated as discrete blocks, various blocks may be divided into additional blocks, combined into fewer blocks, or eliminated, depending on the desired implementation.

In some embodiments, method 400 may be performed by a system such as JSON representation system 100 of FIGS. 1A and 1B. For instance, processing device 160 of FIG. 1B may be configured to execute computer instructions stored on memory 170 to perform functions and operations as represented by one or more of the blocks of method 400.

Method 400 may begin at block 402. At block 402, a grammar object may be created for a received input. For example, an empty grammar object (e.g., Object_i) may be created for an input object_i.

At block 404, properties of the grammar object may be categorized. For example, one or more string properties, one or more number properties, one or more Boolean properties and/or one or more object properties may be categorized.

At block 406, a determination may be made regarding whether a string category has one or more properties. If it is determined that the string category has one or more properties, method 400 may proceed to block 408. If it is determined that the string category does not include one or more properties, method 400 may proceed to block 410.

At block 408, a string category may be processed. For example, employing the SE(*) token, a production "SE (string) Object_i" may be appended to the grammar object (e.g., Object_i) (e.g., as the last production in the grammar object), and method 400 may proceed to block 410.

At block 410, a determination may be made regarding whether a number category has one or more properties. If it is determined that the number category has one or more properties, method 400 may proceed to block 412. If it is determined that the number category does not include one or more properties, method 400 may proceed to block 414.

At block 412, a number category may be processed. For example, employing the SE(*) token, a production "SE (number) Object_i" may be appended to the grammar object (e.g., Object_i) (e.g., as the last production in the grammar object), and method 400 may proceed to block 414.

At block 414, a determination may be made regarding whether a Boolean category has one or more properties. If it is determined that the Boolean category has one or more properties, method 400 may proceed to block 416. If it is determined that the Boolean category does not include one or more properties, method 400 may proceed to block 418.

At block 416, a Boolean category may be processed. For example, employing the SE(*) token, a production "SE (Boolean) Object_i" may be appended to the grammar object (e.g., Object_i) (e.g., as the last production in the grammar object), and method 400 may proceed to block 418.

At block 418, a determination may be made regarding whether an object category has one or more properties. If it is determined that the object category has one or more properties, method 400 may proceed to block 420. If it is determined that the object category does not include one or more properties, method 400 may proceed to block 422.

At block 420, an object category may be processed. For example, employing the SE(*) token, a production "SE (object) Object_i" may be appended to the grammar object (e.g., Object_i) (e.g., as the last production in the grammar object), and method 400 may proceed to block 422.

At block 422, a production may be appended via the EE(*) token (e.g., for exiting the loop), and the EXI grammar may be outputted.

Figure 7:
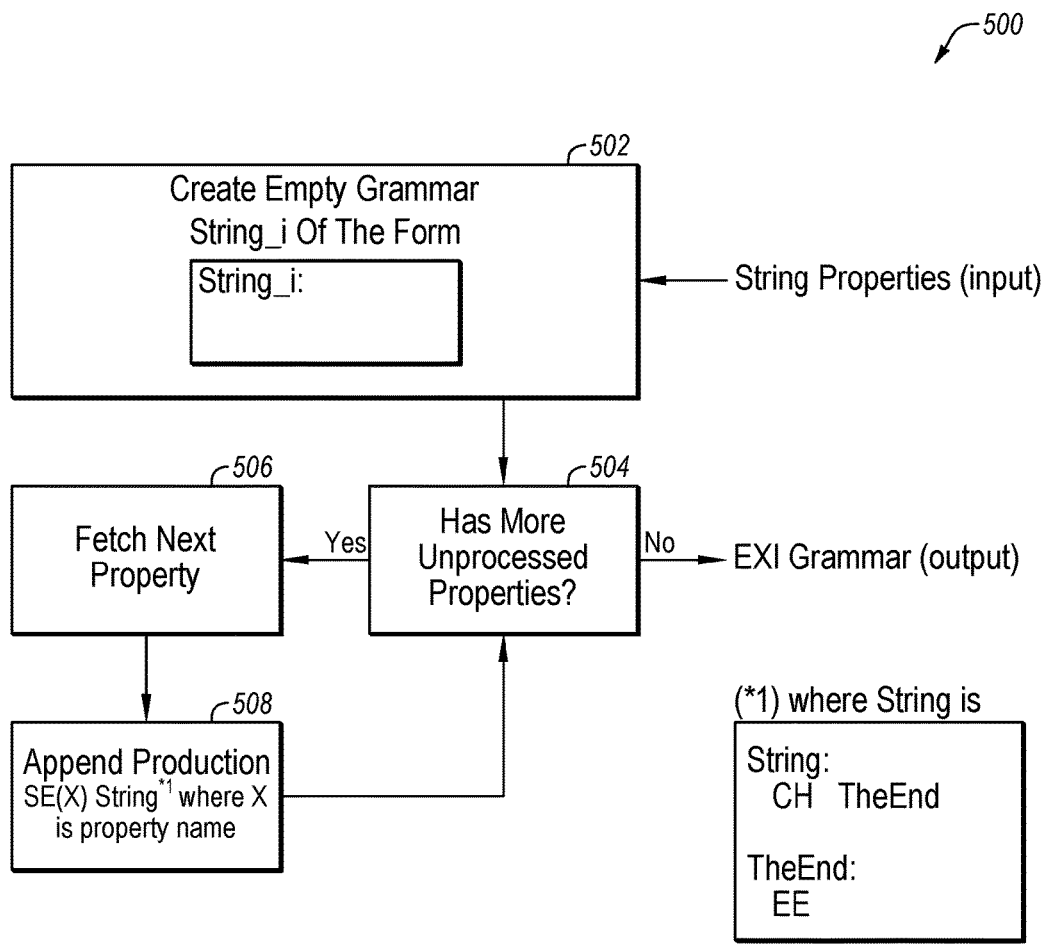
FIG. 7 is a block diagram of an example method of generating an EXI grammar for a string.

Modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment FIG. 7 shows an example flow diagram of a method 500 of processing a string category, arranged in accordance with at least one embodiment described herein. Although illustrated as discrete blocks, various blocks may be divided into additional blocks, combined into fewer blocks, or eliminated, depending on the desired implementation.

In some embodiments, method 500 may be performed by a system such as JSON representation system 100 of FIGS. 1A and 1B. For instance, processing device 160 of FIG. 1B may be configured to execute computer instructions stored on memory 170 to perform functions and operations as represented by one or more of the blocks of method 500.

Method 500 may begin at block 502. At block 502, an empty grammar string (e.g., String_i) may be created for a received input (e.g., one or more string properties), and method 500 may proceed to block 504.

At block 504, a determination may be made regarding whether a string category has one or more unprocessed properties. If the string category has one or more unprocessed properties, method 500 may proceed to block 506. If the string category does not have one or more unprocessed properties, an EXI grammar may be outputted.

At block 506, the next property of the string category may be fetched, and method 500 may proceed to block 508.

At block 508, a property may be processed. For example, employing the SE(*) token, a production "SE(X) String*$^1$", wherein X is the property name, may be appended to the grammar string (e.g., String_i) (e.g., as the last production in the grammar string), and method 500 may proceed to block 504.

Figure 8:
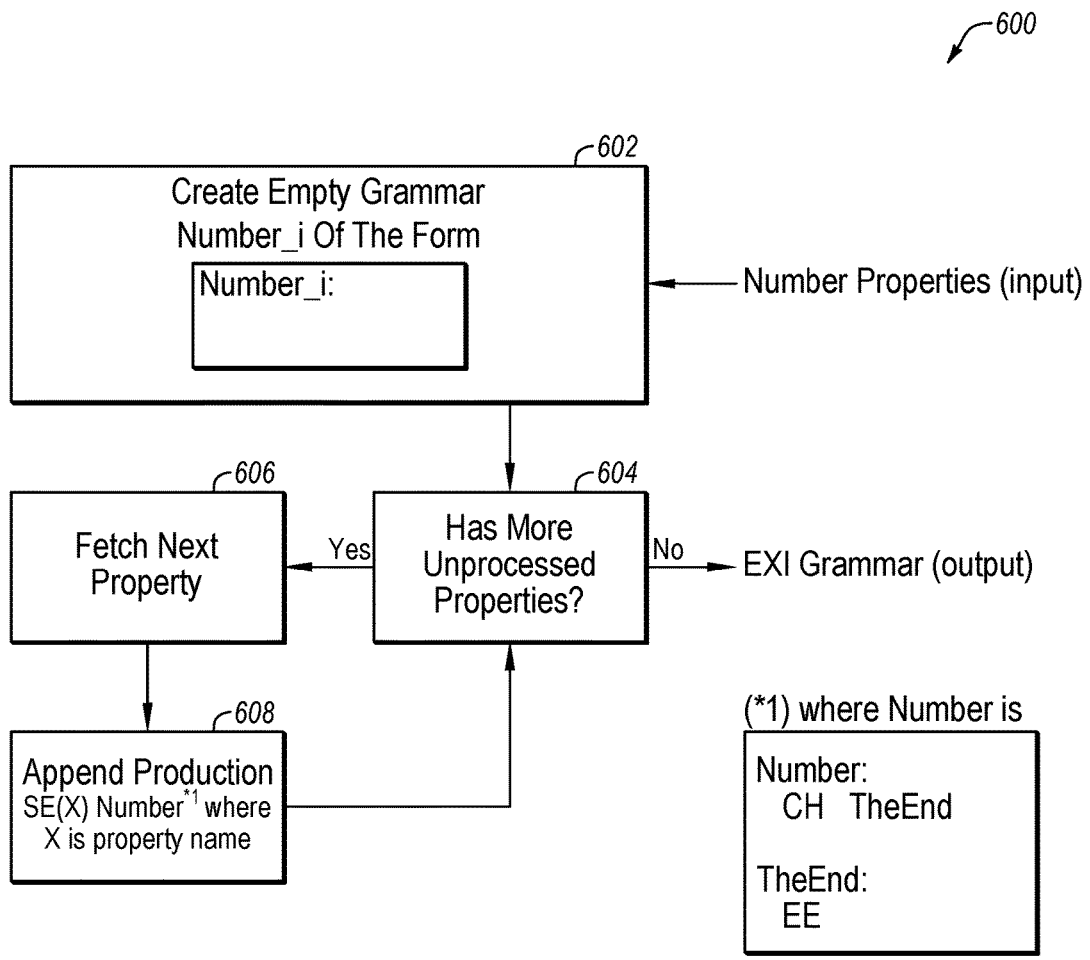
FIG. 8 is a block diagram of an example method of generating an EXI grammar for a number.

Modifications, additions, or omissions may be made to method 500 without departing from the scope of the present disclosure. For example, the operations of method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment FIG. 8 shows an example flow diagram of a method 600 of processing a number category, arranged in accordance with at least one embodiment described herein. Although illustrated as discrete blocks, various blocks may be divided into additional blocks, combined into fewer blocks, or eliminated, depending on the desired implementation.

In some embodiments, method 600 may be performed by a system such as JSON representation system 100 of FIGS. 1A and 1B. For instance, processing device 160 of FIG. 1B may be configured to execute computer instructions stored on memory 170 to perform functions and operations as represented by one or more of the blocks of method 600.

Method 600 may begin at block 602. At block 602, an empty grammar number (e.g., Number_i) may be created for a received input (e.g., one or more number properties), and method 600 may proceed to block 604.

At block 604, a determination may be made regarding whether a number category has one or more unprocessed properties. If the number category has one or more unprocessed properties, method 600 may proceed to block 606. If the number category does not have one or more unprocessed properties, an EXI Grammar may be outputted.

At block 606, the next property of the number category may be fetched, and method 600 may proceed to block 608.

At block 608, a property may be processed. For example, employing the SE(*) token, a production "SE(X) Number*[1]", wherein X is the property name, may be appended to the grammar number (e.g., Number_i) (e.g., as the last production in the grammar number), and method 600 may proceed to block 604.

Figure 9:
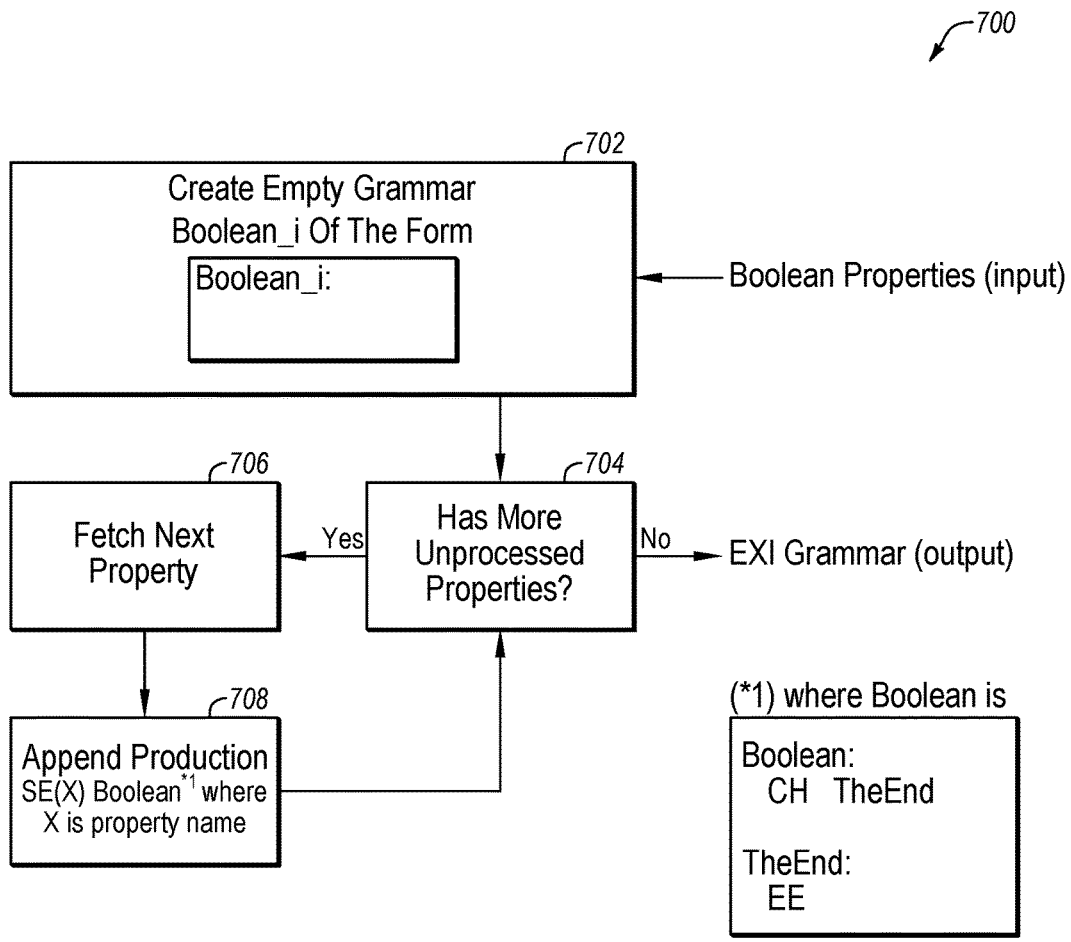
FIG. 9 is a block diagram of an example method of generating an EXI grammar for a Boolean.

Modifications, additions, or omissions may be made to method 600 without departing from the scope of the present disclosure. For example, the operations of method 600 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment FIG. 9 shows an example flow diagram of a method 700 of processing a Boolean category, arranged in accordance with at least one embodiment described herein. Although illustrated as discrete blocks, various blocks may be divided into additional blocks, combined into fewer blocks, or eliminated, depending on the desired implementation.

In some embodiments, method 700 may be performed by a system such as JSON representation system 100 of FIGS. 1A and 1B. For instance, processing device 160 of FIG. 1B may be configured to execute computer instructions stored on memory 170 to perform functions and operations as represented by one or more of the blocks of method 700.

Method 700 may begin at block 702. At block 702, an empty grammar Boolean (e.g., Boolean_i) may be created for a received input (e.g., one or more Boolean properties), and method 700 may proceed to block 704.

At block 704, a determination may be made regarding whether a Boolean category has one or more unprocessed properties. If the Boolean category has one or more unprocessed properties, method 700 may proceed to block 706. If the Boolean category does not have one or more unprocessed properties, an EXI Grammar may be outputted.

At block 706, the next property of the Boolean category may be fetched, and method 700 may proceed to block 708.

At block 708, a property may be processed. For example, employing the SE(*) token, a production "SE(X) Boolean*[1]", wherein X is the property name, may be appended to the grammar Boolean (e.g., Boolean_i) (e.g., as the last production in the grammar Boolean), and method 700 may proceed back to block 704.

Figure 10:
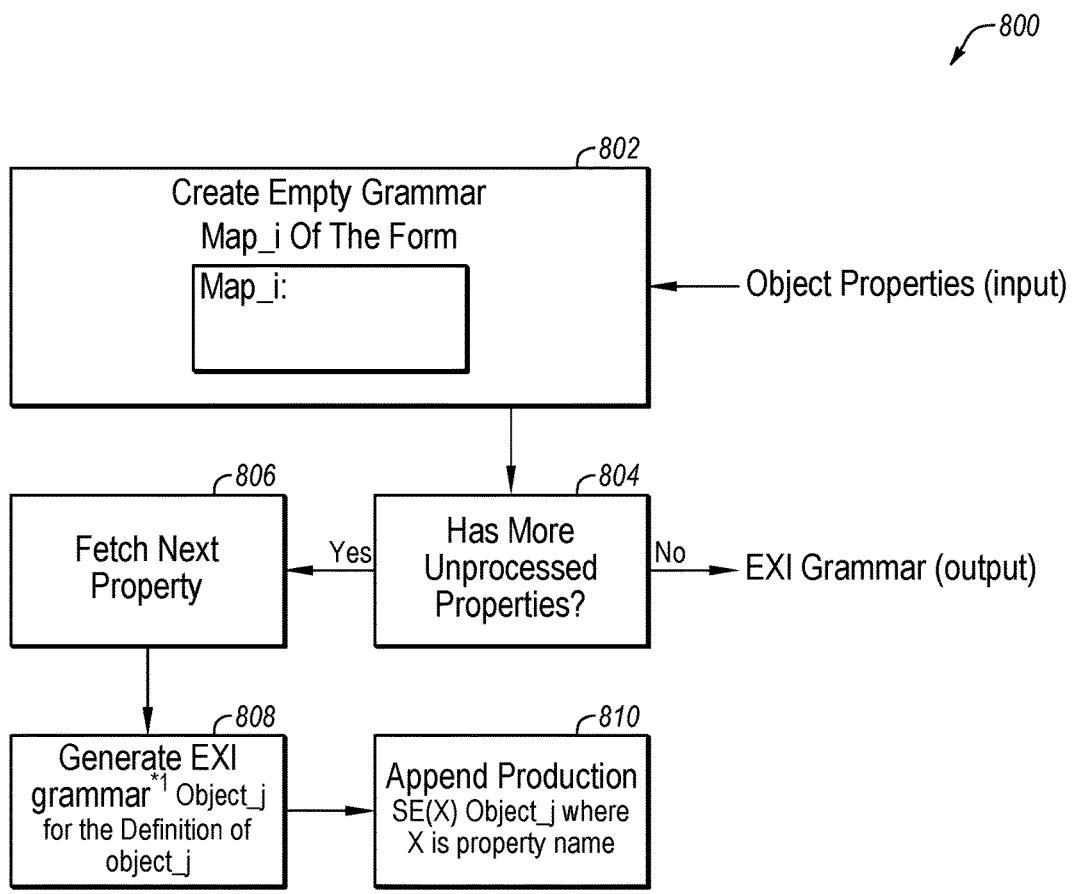
FIG. 10 is a block diagram of an example method of generating an EXI grammar for an object.

Modifications, additions, or omissions may be made to method 700 without departing from the scope of the present disclosure. For example, the operations of method 700 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment FIG. 10 shows an example flow diagram of a method 800 of processing an object category, arranged in accordance with at least one embodiment described herein. Although illustrated as discrete blocks, various blocks may be divided into additional blocks, combined into fewer blocks, or eliminated, depending on the desired implementation.

In some embodiments, method 800 may be performed by a system such as JSON representation system 100 of FIGS. 1A and 1B. For instance, processing device 160 of FIG. 1B may be configured to execute computer instructions stored on memory 170 to perform functions and operations as represented by one or more of the blocks of method 800.

Method 800 may begin at block 802. At block 802, an empty grammar map (e.g., Map_i) may be created for a received input (e.g., one or more object properties), and method 800 may proceed to block 804.

At block 804, a determination may be made regarding whether an object category has one or more unprocessed properties. If the object category has one or more unprocessed properties, method 800 may proceed to block 806. If the object category does not have one or more unprocessed properties, an EXI Grammar may be outputted.

At block 806, the next property of the object category may be fetched, and method 800 may proceed to block 808.

At block 808, an EXI grammar object (e.g., Object_j) may be generated, and method 800 may proceed to block 810. It is noted that for each received input (e.g., one or more object properties), EXI grammar Object_j may be created in a manner as described above in relation to FIG. 6.

At block 810, an object property may be processed. For example, employing the SE(*) token, a production "SE(X) Object_j, wherein X is the property name, may be appended to the grammar map (e.g., Map_i) (e.g., as the last production in the grammar map), and method 800 may proceed to block 804.

Modifications, additions, or omissions may be made to method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of converting a JavaScript Object Notation (JSON) schema to an Efficient Extensible Markup Language (XML) Interchange (EXI) document, the method comprising:
   obtaining a JSON schema including a JSON property name, the JSON property name comprising a string of characters;
   generating an XML structure from the JSON schema for data at a first size, the XML structure including one or more properties and an XML attribute name including the string of characters of the JSON property name;
   generating an EXI grammar including the string of characters of the JSON property name based on the XML structure including the XML attribute name including the string of characters of the JSON property name; and
   generating an EXI document for the data at a second size smaller than the first size and based on the EXI grammar.

2. The method of claim 1, wherein generating the EXI document comprises encoding, by a processor-based computing device programmed to perform the encoding, the EXI document representing the JSON schema based on the EXI grammar.

3. The method of claim 1, wherein generating the EXI grammar comprises categorizing at least one of at least one string property of the one or more properties, at least one number property of the one or more properties, at least one Boolean property of the one or more properties, and at least one object property of the one or more properties.

4. The method of claim 1, wherein generating the EXI grammar comprises processing at least one of a string category, a number category, a Boolean category, and an object category.

5. The method of claim 1, wherein generating the EXI grammar comprises processing a string category comprising:
   creating the EXI grammar based on an input including at least one string property of the one or more properties;
   processing each property of the at least one string property to append each property of the at least one string property to the EXI grammar; and
   outputting the EXI grammar upon processing each property of the at least one string property.

6. The method of claim 5, further comprising:
   determining whether the at least one string property includes an unprocessed property; and
   fetching the unprocessed property for processing upon determining that the at least one string property includes the unprocessed property.

7. The method of claim 1, wherein generating the EXI grammar comprises processing a number category comprising:
   creating the EXI grammar based on an input including at least one number property of the one or more properties;
   processing each property of the at least one number property to append each property of the at least one number property to the EXI grammar; and
   outputting the EXI grammar upon processing each property of the at least one number property.

8. The method of claim 7, further comprising:
   determining whether the at least one number property includes an unprocessed property; and
   fetching the unprocessed property for processing upon determining that the at least one number property includes the unprocessed property.

9. The method of claim 1, wherein generating the EXI grammar comprises processing a Boolean category comprising:
   creating the EXI grammar based on an input including at least one Boolean property of the one or more properties;
   processing each property of the at least one Boolean property to append each property of the at least one Boolean property to the EXI grammar; and
   outputting the EXI grammar upon processing each property of the at least one Boolean property.

10. The method of claim 9, further comprising:
    determining whether the at least one Boolean property includes an unprocessed property; and
    fetching the unprocessed property for processing upon determining that the at least one Boolean property includes the unprocessed property.

11. The method of claim 1, wherein generating the EXI grammar comprises processing an object category comprising:
    creating the EXI grammar based on an input including at least one object property of the one or more properties;
    processing each property of the at least one object property to append each property of the at least one object property to the EXI grammar; and
    outputting the EXI grammar upon processing each property of the at least one object property.

12. The method of claim 11, further comprising:
    determining whether the at least one object property includes an unprocessed property; and fetching the unprocessed property for processing upon determining that the at least one object property includes the unprocessed property.

13. A non-transitory computer-readable medium having computer instructions stored thereon that are executable by a processing device to perform or control performance of operations comprising:
   obtaining a JSON schema including a JSON property name, the JSON property name comprising a string of characters;
   generating an XML structure from the JSON schema for data at a first size, the XML structure including one or more properties and an XML attribute name including the string of characters of the JSON property name;
   generating an EXI grammar including the string of characters of the JSON property name based on the XML structure including the XML attribute name including the string of characters of the JSON property name; and
   generating an EXI document for the data at a second size smaller than the first size and based on the EXI grammar.

14. The non-transitory computer-readable medium of claim 13, wherein generating the EXI document comprises encoding the EXI document representing the JSON schema based on the EXI grammar.

15. The non-transitory computer-readable medium of claim 13, wherein generating the EXI grammar comprises categorizing at least one of at least one string property of the one or more properties, at least one number property of the one or more properties, at least one Boolean property of the one or more properties, and at least one object property of the one or more properties.

16. The non-transitory computer-readable medium of claim 13, wherein generating the EXI grammar comprises processing at least one of a string category, a number category, a Boolean category, and an object category.

17. The non-transitory computer-readable medium of claim 13, wherein generating the EXI Grammar comprises processing a string category comprising:
   creating the EXI grammar based on an input including at least one string property of the one or more properties;
   processing each property of the at least one string property to append each property of the at least one string property to the EXI grammar; and
   outputting the EXI grammar upon processing each property of the at least one string property.

18. The non-transitory computer-readable medium of claim 13, wherein generating the EXI Grammar comprises processing a number category comprising:
   creating the EXI grammar based on an input including at least one number property of the one or more properties;
   processing each property of the at least one number property to append each property of the at least one number property to the EXI grammar; and
   outputting the EXI grammar upon processing each property of the at least one number property.

19. The non-transitory computer-readable medium of claim 13, wherein generating the EXI Grammar comprises processing a Boolean category comprising:
   creating the EXI grammar based on an input including at least one Boolean property of the one or more properties;
   processing each property of the at least one Boolean property to append each property of the at least one Boolean property to the EXI grammar; and
   outputting the EXI grammar upon processing each property of the at least one Boolean property.

20. The non-transitory computer-readable medium of claim 13, wherein generating the EXI Grammar comprises processing an object category comprising:
   creating the EXI grammar based on an input including at least one object property of the one or more properties;
   processing each property of the at least one object property to append each property of the at least one object property to the EXI grammar; and
   outputting the EXI grammar upon processing each property of the at least one object property.

* * * * *